April 12, 1960     W. H. MOYER     2,932,363
APPARATUS FOR SEPARATING VAPOR AND LIQUID
Filed June 28, 1957     2 Sheets-Sheet 1
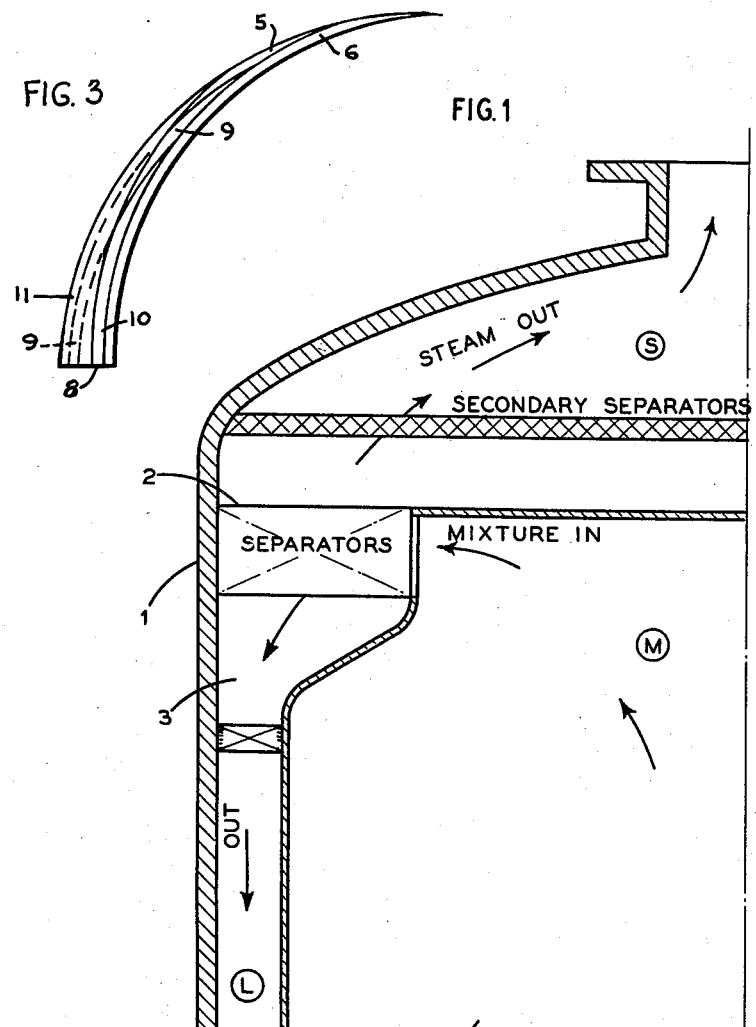
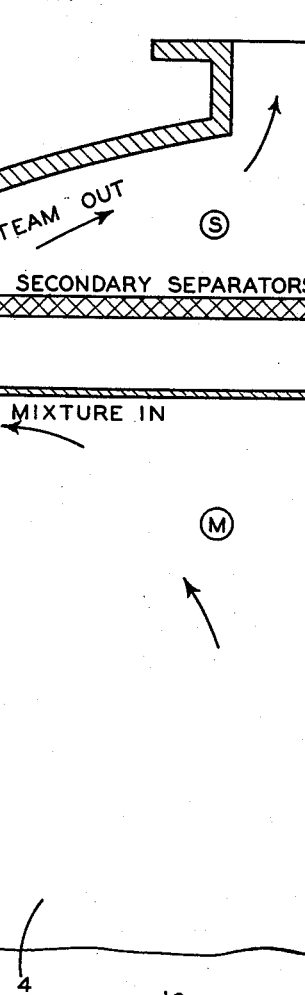
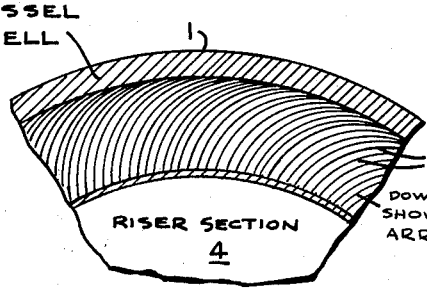
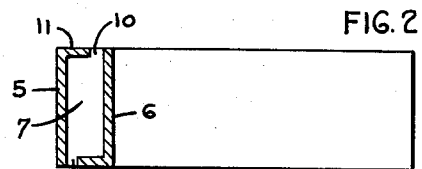
INVENTOR.
William H. Moyer
BY
ATTORNEY April 12, 1960 W. H. MOYER 2,932,363
APPARATUS FOR SEPARATING VAPOR AND LIQUID
Filed June 28, 1957 2 Sheets-Sheet 2

INVENTOR.
William H. Moyer
BY
ATTORNEY

United States Patent Office 2,932,363
Patented Apr. 12, 1960

2,932,363

APPARATUS FOR SEPARATING VAPOR AND LIQUID

William H. Moyer, Alliance, Ohio, assignor to The Babcock & Wilcox Company, New York, N.Y., a corporation of New Jersey Application June 28, 1957, Serial No. 668,805

8 Claims. (Cl. 183—79)

This invention relates in general to the construction of vapor-liquid separators and more particularly to an improved vapor-liquid separator utilizing centrifugal force to separate the mixture into its components.

Centrifugal separators augment the force tending to separate vapor from liquid by subjecting a stream of vapor-liquid mixture to a whirling motion in which centrifugal force moves the heavy liquid to the outer periphery of the moving stream while the lighter vapor stays on the interior of the stream. Most of the prior art centrifugal separators whirl the mixture of vapor and liquid throughout 360 degrees or more to effect the separation. Studies of the action of this type separators show that after 180 degrees of angular whirl the flow stream begins to mix with the prior whirling portions and the flow becomes confused causing re-entrainment of the vapor in the later stream. It appears that the major portion of the separation occurs in the first 180 degrees of whirl. A second factor that has been determined to be important in centrifugal separation is to maintain the thickness of the whirling stream slightly greater than the thickness of the vapor bubbles entrained therein as this reduces the distance that the vapor has to travel in order to become separated. Further, it has been deemed that efficient separation may be further enhanced by providing separate exits for the individual components of the mixture.

Accordingly, my invention involves forming a vapor-liquid separator of nested curvilinear smooth plates arranged in pairs to define a narrow passage therebetween. Each plate of said pairs curved in one direction at an angle of less than 180 degrees with said plates joined at one end and open at the opposite end to define increasingly converging curved vertically disposed passage open at the top and bottom thereof.

Further, my invention provides a combination of the vapor-liquid separators with a vapor-liquid collection chamber feeding vapor-liquid to the separator and separated vapor and liquid spaces to receive the separated components from the separators.

It is therefore an object of this development to provide an improved vapor-liquid separator wherein the distance which the fluid traverses prior to separation is reduced by introducing the fluid into the separator in a narrow stream.

It is another object to increase the velocity with which the vapor travels toward the surface of the mixture by imposing a centrifugal force on said mixture.

It is another object to provide an improved separator wherein the steam that has already separated from the mixture in the riser section is not re-entrained when entering the separator.

It is still another object of the subject development to minimize carry-over and carry-under and accomplish all of the aforestated objects by means of the subject apparatus.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

Of the drawings:

Fig. 1 is a vertical section of a type of system wherein subject device or devices may be utilized.

Fig. 2 is a vertical section of an embodiment designed to accomplish the aforesaid object.

Fig. 3 is a plan section of Fig. 2.

Fig. 4 is a cross section illustrating a downcomer arrangement for a plurality of separators as seen in Fig. 2.

Figure 6:
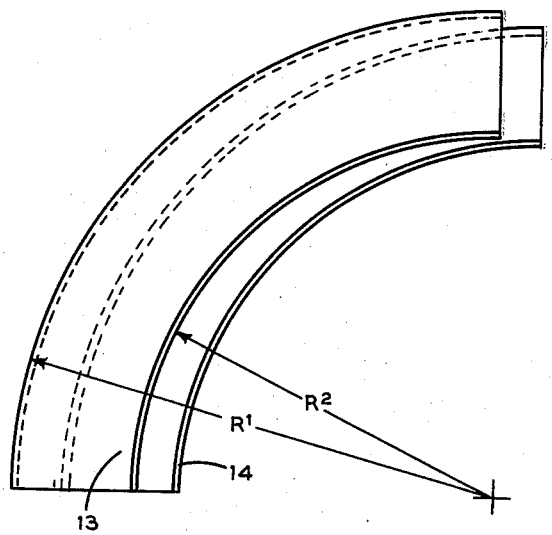
Fig. 6 is a plan section of Fig. 5.

Many vaporizable liquid separator systems must have a higher capacity and lower pressure drop and operate at a lower void fraction than separators normally utilized in standard vapor generating practice. A cross section of such a system, for which separators are required, is shown in Fig. 1. This arrangement comprises a vertically disposed cylindrical vessel 1. A mixture M of vapor and liquid enters a plurality of separators 2 at the top of the system. The liquid L is separated from the vapor S and passes into an annular space encompassing the system. Said annulus 3 is known in the art as the "downcomer." The liquid L passes to the bottom of said downcomer 3 where it may either reverse direction of flow and rise in the central portion of the cylinder as it is heated and which is referred to in the art as the "riser" section 4 or pass through a separate vapor generator (not shown).

In operation, a vapor-liquid mixture M is present in the riser 4 which passes through the separator 2 with vapor S passing out of the top of the vessel as indicated and the separated liquid going down the downcomer 3. The riser 4 is considered to be a vapor-liquid collection chamber prior to entry of the mixture into the separators. Any vapor in the liquid immediately below the separator 2 in the downcomer 3 is called "carry-under"—i.e., any vapor discharged through the separator liquid outlets. The percent of vapor by volume at any location within the system is referred to as void fraction.

The differences in void fractions in the riser 4 and the downcomer 3 results in a static pressure differential in the circulation system. Said static pressure differential is balanced by dynamic pressure losses throughout the system. The separator pressure drop or available pressure drop is the difference between the static pressure differential and the dynamic pressure losses exclusive of the separators 2 and the related distribution losses (not shown). Carry-under reduces the available pressure drop by lowering the difference in void fraction between the riser 4 and the downcomer 3 sections. It is further known in standard vapor generating practice that the pressure drop through a vapor-liquid separator is more than compensated for by an increase in static pressure resulting from a decrease in vapor-carry-under.

With a larger static pressure, it is possible to obtain a higher circulation mass flow rate and thus greater power removal at the same void fraction. Said higher flow rate further allows a lower vapor density in the mixture than is attainable in a prior art natural separation system.

Further examination of Fig. 1 reveals that the vapor S flows out of the separator into the top of the vapor generating section. Any liquid contained in the vapor at this point is called "carry-over." The vapor then leaves the afore-described system and passes to a point of use (not shown) wherein it is condensed and returned to the top of the riser section as feedwater.

It is known that the speed of separation of two fluids is dependent upon the following factors: (1) the distance a dispersed fluid has to travel before being separated from the surface of the mixture; (2) the velocity with which said fluid is traveling toward the mixture surface; and (3) the relative physical properties of the two fluids.

Referring to Fig. 2, an improved vapor-liquid separator, which is hereinafter referred to as a two-arc separator, is shown comprising two vertically disposed, elongated arcuate sheets 5, 6, which are seen from the top view as being C-shaped in configuration of an arc of less than 180 degrees and as illustrated as being two 90 degree sheet metal arcs each being of the same radius, but having displaced centers of curvature. Said sheets 5, 6, are rigidly joined at one end and displaced at the other whereby an increasingly converging, vertically disposed arcuate channel 7 is formed between said sheets. The opening for said channel 7 formed at the displaced ends of said sheets 5, 6 is equal to the displacement of the centers of curvature for the two arcs and is preferably one half of an inch when operating at 1000 p.s.i.a.

The preferred proportion of the separator is an arc radius of 0.15 times the riser diameter and an inlet height of 0.177 times the riser diameter.

In operation, the mixture enters the separator through the opening 8 formed by the displaced ends of the sheets. The liquid in the mixture is thrown to the outer wall of the channel 7 by centrifugal forces. It is then discharged out of the bottom of the separator through a liquid discharge opening 9. This is effected by means of gravity acting in combination with the aforesaid centrifugal forces. The vapor contained within the entering mixture is collected along the inner wall of the channel 7, and then rises out of the top of the separator through vapor discharge opening 10.

To minimize carry-over and carry-under during the separation, the openings 9, 10 may be partially blocked by means of arcuate baffles 11, 12 whereby said openings 9, 10 are further defined over or under the area where the fluid to be discharged (either vapor or liquid) is predominant.

*Example I*

Tests were made on 9 and 18 inch high vertical two arc separators using an air-water mixture which illustrated that there was an increase in water separating capacity with an increase in height compared to prior art centrifugal separators. The areas of the riser and downcomer in this system were specified as being equal. Approximately 170 separators could be arranged over the downcomer in this proposed system as illustrated in Fig. 3. Under a predetermined set of operating conditions these 170 separators would have to separate approximately 1,170,000 pounds of vapor per hour (522,000 cubic feet per hour) or individually 3,070 cubic feet per hour at an operating pressure of 1000 pounds per square inch.

Air-water tests made on one 18 inch high vertical two-arc separator showed satisfactory separation, however, the range of void fractions for this vertical two-arc separator exceeded the desired range. So while this design seemed an advancement in the art it did not fully meet the unique conditions desired.

The action of this separator further indicated that higher separating force is not as great a problem in separator designs as the prevention of re-entrainment of the vapor by liquid. The tests also indicated that a curved baffling as described may alleviate re-entrainment in carry-over in some systems if water capacity could be increased.

Figure 5:
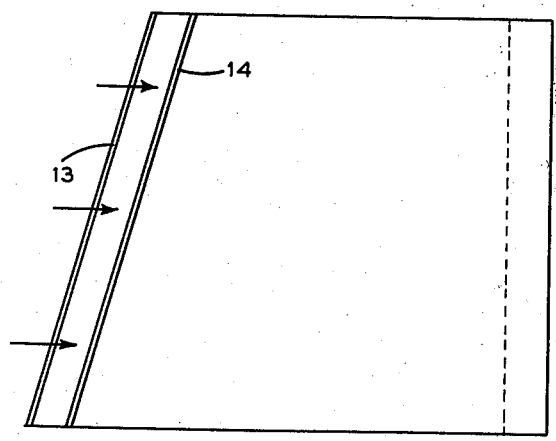
Fig. 5 is a cross section of another embodiment of a vapor-liquid separator.

Referring to Fig. 5, a second embodiment of an improved vapor-liquid separator, designed to increase the capacity of the afore-described two-arc separator, is shown. Said separator, herein referred to as the "inclined two-arc separator," operates in a manner similar to the aforesaid two-arc separator. Said separator comprises two vertically inclined elongated sheets 13, 14 which are seen from the top as being quadrants of truncated right circular cones (e.g., two 90 degree sheet metal sections of right circular truncated cones, the centers of which are displaced as to form a gap equal to the displacement of the centers of curvature at one end of the arcs, and to seal the other end of the arcs). The sloping of the sides of said separator increases the water capacity by increasing the effect of centrifugal force in removing the water. The preferred slope angle is approximately 75 degrees but obviously may be effectively set at any angle above 45 degrees from horizontal.

*Example II*

Tests indicated that the inclined two arc separator was a preferred embodiment under the following conditions and ranges of operation:

Void fraction approaching the separators 30–72%.
Vapor density of 6000–60,000 lb./hr.-ft.$^2$ (pounds of steam per hour per square foot of riser section).
Pressure drop up to 3.6 p.s.i.
System pressure of 1000 p.s.i.

The separator of Fig. 4 may be effectively used with arc baffles similar to baffles 11 and 12 of Fig. 2.

The aforesaid embodiments are given as explanation and are not to be construed as limitations to the scope of the development. It is known that particular adaption of subject development to any given system would be largely empirical regarding exact dimensions and materials of construction.

While in accordance with the provisions of the statutes, I have illustrated and described herein a specific form of the invention now known to me, those skilled in the art will understand that changes may be made in the form of the apparatus disclosed without departing from the spirit of the invention covered by my claims, and that certain features of the invention may sometimes be used to advantage without a corresponding use of the other features.

I claim:

1. In a vapor-liquid separating apparatus, nested curvilinear smooth plates arranged in pairs to define a narrow flow passage therebetween, each of said plates curved in one direction an angle of less than 180 degrees, said plates joined in pairs to close one end and open at the opposite inlet end to define an increasingly converging curved flow passage open for vapor escape at the top and liquid escape at the bottom thereof.

2. In a vapor-liquid separating apparatus, nested curvilinear smooth plates arranged in pairs to define a narrow flow passage therebetween, each of said plates curved in one direction an angle of less than 180 degrees, said plates joined in pairs to close one end and open at the opposite inlet end to define an increasingly converging curved flow passage open for vapor escape at the top and liquid escape at the bottom thereof, and an arcuate baffle plate attached to one of said plates at the top thereof and arranged to partially close the top opening of the passage.

3. In a vapor-liquid separating apparatus, nested curvilinear smooth plates arranged in pairs to define a narrow flow passage therebetween, each of said plates curved in one direction an angle of less than 180 degrees, said plates joined in pairs to close one end and open at the opposite inlet end to define an increasingly converging curved flow passage open for vapor escape at the top and liquid escape at the bottom thereof, and an arcuate baffle plate attached to one of said plates at the bottom thereof and arranged to partially close the bottom opening of the passage.

4. In a vapor-liquid separating apparatus nested curvilinear smooth plates arranged in pairs to define a narrow flow passage therebetween, each of said plates curved in one direction an angle of less than 180 degrees, said plates joined in pairs to close one end and open at the opposite inlet end to define an increasingly converging curved flow passage open for vapor escape at the top and liquid escape at the bottom thereof, and an arcuate baffle plate attached to one of said plates at the top thereof and arranged to partially close the top opening of the passage, and a second arcuate baffle plate attached to one of said plates at the bottom thereof and arranged to partially close the bottom opening of the passage.

5. In a vapor-liquid separating apparatus, nested curvilinear smooth plates arranged in pairs to define a narrow flow passage therebetween, each of said plates curved in one direction an angle of less than 180 degrees, said plates joined in pairs to close one end and open at the opposite inlet end to define an increasingly converging curved flow passage open for vapor escape at the top and liquid escape at the bottom thereof, each pair of plates formed to present a generally upright flow passage but inclined from the vertical.

6. In a vapor-liquid separating apparatus including a drum having an upper vapor space, means forming a centrally arranged vapor-liquid collection chamber below said space and an annular separated liquid downcomer, vapor-liquid separating means arranged with an inlet to receive a vapor-liquid mixture from said collection chamber and having a vapor outlet to said vapor space and liquid outlet to said liquid downcomer, said separating means comprising nested curvilinear smooth plates arranged in pairs to define a narrow flow passage therebetween, each of said plates curved in one direction an angle of less than 180 degrees, said plates joined in pairs to close one end and open at the opposite inlet end to define an increasingly converging curved flow passage open for vapor escape at the top and liquid escape at the bottom thereof.

7. In a vapor-liquid separating apparatus including a drum having an upper vapor space, means forming a centrally arranged vapor-liquid collection chamber below said space and an annular separated liquid downcomer, vapor-liquid separating means arranged with an inlet to receive a vapor-liquid mixture from said collection chamber and having a vapor outlet to said vapor space and liquid outlet to said liquid downcomer, said separating means comprising nested curvilinear smooth plates arranged in pairs to define a narrow flow passage therebetween, each of said plates curved in one direction an angle of less than 180 degrees, said plates joined in pairs to close one end and open at the opposite inlet end to define an increasingly converging curved flow passage open for vapor escape at the top and liquid escape at the bottom thereof, an arcuate baffle plate attached to one of said plates at the top thereof and arranged to partially close the top opening of the passage and a second arcuate baffle plate attached to one of said plates at the bottom thereof and arranged to partially close the bottom opening of the passage.

8. In a vapor-liquid separating apparatus including a drum having an upper vapor space, means forming a centrally arranged vapor-liquid collection chamber below said space and an annular separated liquid downcomer, vapor-liquid separating means arranged with an inlet to receive a vapor-liquid mixture from said collection chamber and having a vapor outlet to said vapor space and liquid outlet to said liquid downcomer, said separating means comprising nested curvilinear smooth plates arranged in pairs to define a narrow flow passage therebetween, each of said plates curved in one direction an angle of less than 180 degrees, said plates joined in pairs to close one end and open at the opposite inlet end to define an increasingly converging curved flow passage open for vapor escape at the top and liquid escape at the bottom thereof, each pair of plates formed to present a generally upright flow passage but inclined from the vertical.

References Cited in the file of this patent

UNITED STATES PATENTS

| | | |
|---|---|---|
| 756,537 | Simonds | Apr. 5, 1904 |
| 1,591,147 | Wales | July 6, 1926 |
| 1,708,651 | Bradshaw | Apr. 9, 1929 |
| 2,474,695 | Schneible et al. | June 28, 1949 |
| 2,546,246 | Whiton | Mar. 27, 1951 |
| 2,739,668 | Huge | Mar. 27, 1956 |
| 2,846,024 | Bremi | Aug. 5, 1958 |

FOREIGN PATENTS

| | | |
|---|---|---|
| 48,993 | France | June 28, 1938 |
| | (1st addition to No. 819,621) | |
| 896,493 | Germany | Nov. 12, 1953 |